US010084405B2

United States Patent
Yoshimura et al.

(10) Patent No.: US 10,084,405 B2
(45) Date of Patent: Sep. 25, 2018

(54) CONTROL DEVICE FOR POWER CONVERSION DEVICE, POWER CONVERSION DEVICE, ELECTRIC MOTOR DRIVE SYSTEM USING SAID DEVICES, COMPRESSOR DRIVE SYSTEM, AND GAS TURBINE POWER GENERATION SYSTEM

(71) Applicant: HITACHI, LTD., Tokyo (JP)

(72) Inventors: Masatoshi Yoshimura, Tokyo (JP); Naohiro Kusumi, Tokyo (JP); Noriaki Hino, Tokyo (JP); Tomofumi Shiraishi, Tokyo (JP); Aung Ko Thet, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/548,173

(22) PCT Filed: Feb. 16, 2015

(86) PCT No.: PCT/JP2015/054067
§ 371 (c)(1),
(2) Date: Aug. 2, 2017

(87) PCT Pub. No.: WO2016/132421
PCT Pub. Date: Aug. 25, 2016

(65) Prior Publication Data
US 2018/0026569 A1 Jan. 25, 2018

(51) Int. Cl.
*H02P 3/14* (2006.01)
*H02P 27/14* (2006.01)
(Continued)

(52) U.S. Cl.
CPC ............... *H02P 27/14* (2013.01); *F02C 7/32* (2013.01); *F04D 25/06* (2013.01); *H02M 7/537* (2013.01);
(Continued)

(58) Field of Classification Search
CPC . H02M 2007/4803; H02M 2007/4822; H02M 7/42; H02M 7/48; H02M 7/487;
(Continued)

(56) References Cited

U.S. PATENT DOCUMENTS

| 4,119,861 A * | 10/1978 | Gocho .................... F01D 19/00 180/65.265 |
| 5,625,550 A | 4/1997 | Leggate et al. |

(Continued)

FOREIGN PATENT DOCUMENTS

| JP | 61-240859 A | 10/1986 |
| JP | 02-084072 A | 3/1990 |
| JP | 2003-088173 A | 3/2003 |

OTHER PUBLICATIONS

International Search Report for WO 2016/132421 A1, dated Apr. 14, 2015.

*Primary Examiner* — Harry Behm
*Assistant Examiner* — Bryan R Perez
(74) *Attorney, Agent, or Firm* — Volpe and Koenig, P.C.

(57) ABSTRACT

A control device for power conversion device controls a power conversion device in a system driven by the power conversion device to which an electric motor outputs AC power, and includes: a control pulse generation unit configured to generate a control pulse of the power conversion device; and a negative phase creation unit configured to input a pulse signal output by the control pulse generation unit and rotational speed information of the electric motor, and to generate an inverted signal of an output signal of the control pulse generation unit, wherein the pulse signal of a half cycle during one cycle of voltage, the pulse signal being generated by the control pulse generation unit, and a pulse signal of a next half cycle during the one cycle of voltage, the pulse signal being generated by the negative phase
(Continued)

creation unit, are symmetrical in positive and negative relationship of voltage.

10 Claims, 10 Drawing Sheets

(51) Int. Cl.
*H02M 7/537* (2006.01)
*F02C 7/32* (2006.01)
*F04D 25/06* (2006.01)
*H02P 27/08* (2006.01)
*H02M 7/5387* (2007.01)
*H02M 1/08* (2006.01)
*H02P 101/25* (2016.01)

(52) U.S. Cl.
CPC ............... *H02P 3/14* (2013.01); *H02P 27/08* (2013.01); *F05D 2220/32* (2013.01); *F05D 2220/76* (2013.01); *H02M 1/08* (2013.01); *H02M 1/081* (2013.01); *H02M 7/53871* (2013.01); *H02P 2101/25* (2015.01); *H02P 2209/01* (2013.01); *H05K 999/99* (2013.01)

(58) Field of Classification Search
CPC .... H02M 7/493; H02M 7/501; H02M 7/4826; H02M 7/49; H02M 7/4807; H02M 7/537; H02M 7/5387
See application file for complete search history.

(56) References Cited

U.S. PATENT DOCUMENTS

| | | | |
|---|---|---|---|
| 2013/0033205 A1* | 2/2013 | Furukawa | H02P 21/0003 318/400.02 |
| 2013/0176761 A1* | 7/2013 | Hattori | B60L 11/14 363/131 |
| 2013/0322133 A1* | 12/2013 | Li | G01R 31/025 363/37 |

* cited by examiner

CONTROL DEVICE FOR POWER CONVERSION DEVICE, POWER CONVERSION DEVICE, ELECTRIC MOTOR DRIVE SYSTEM USING SAID DEVICES, COMPRESSOR DRIVE SYSTEM, AND GAS TURBINE POWER GENERATION SYSTEM

TECHNICAL FIELD

The present invention relates to a control device for power conversion device, a power conversion device, an electric motor drive system using the devices, a compressor drive system, and a gas turbine power generation system.

BACKGROUND ART

Conventionally, power conversion devices such as inverters that can convert DC power to AC power with an arbitrary frequency have been widely used for drive control of electric motors. An inverter can turn ON and OFF a semiconductor switching element on the basis of a voltage command value to output power with a desired frequency, thereby to control an electric motor drive current. PWM control to determine switching timing of the element with a pulse width modulation (PWM) signal is often used for the control of the switching element of the inverter.

This PWM control includes asynchronous PWM control to determine the switching timing by simply comparing a signal of the voltage command value and a signal of a carrier wave, and create a PWM pulse.

Further, as technologies other than the above-described basic asynchronous PWM control, there are PTL 1 and PTL 2.

PTL 1 discloses a technology of synchronous PWM control, in which "a synchronous PWM determination device 46 determines the number of synchronization in synchronous PWM control, and a synchronous PWM phase controller 48 determines a frequency of a triangular wave carrier according to the number of synchronization and determines timing of switching the number of synchronization. A PWM control unit 40 performs synchronous PWM control for a phase of a voltage command to synchronize a phase of the triangular wave carrier (see "Solution" in Abstract)".

Further, PTL 2 discloses a technology of PWM control, in which "an inverter control circuit determines a phase of a sine wave reference signal by a phase determination unit 28, performs feedback control only in a period in which a converted AC current waveform is positive and outputs a target current, stores the waveform output in the previous positive period to a storage unit 25 and inverts and outputs the waveform in a negative period, and performs control to make the magnitude of currents to be output in the positive period and in the negative period equal (see "Solution" in Abstract)".

CITATION LIST

Patent Literature

PTL 1: Japanese Patent Application Laid-Open No. 2010-51129
PTL 2: Japanese Patent Application Laid-Open No. 2006-204067

SUMMARY OF INVENTION

Technical Problem

However, in the above-described basic asynchronous PWM control, in a case where the frequency of the carrier wave is relatively close to the frequency of the voltage command value, symmetry of a half cycle of a positive value and a half cycle of a negative value, of one cycle of the output voltage of the inverter, is lost, and problems such as an increase in lower order harmonics and occurrence of a beat phenomenon are caused (see a first comparative example described below, and FIGS. 3, 4A, and 4B).

It is known that large torque pulsation occurs if an electric motor is driven in the above state. In the case where the torque pulsation is large, the torque pulsation of the electric motor causes shaft vibration of a gas turbine and turbine trip may occur in a gas turbine power generation system in which the electric motor is connected to the shaft of the gas turbine. Further, rolling precision may be deteriorated in a rolling mill drive system, and ride quality may be affected in a train or an electric vehicle Further, the synchronous PWM control as described in PTL 1 needs a control unit to adjust the frequency and the phase of the carrier wave to the voltage command value and a control unit to switch the frequency and the number of pulses of the carrier wave, and thus has a problem of complexity of a control circuit. Further, a system in which the frequency of the voltage command value is changed has a problem that symmetry of a voltage of a half cycle and the next half cycle is lost.

Further, the PWM control as described in PTL 2 has a problem that symmetry is lost in a case of a load in which the frequency is changed like variable-speed electric motor drive.

Therefore, the present invention has been made in view of the above-described problems, and an objective thereof is to provide a control device for power conversion device, a power conversion device, an electric motor drive system using the devices, a compressor drive system, and a gas turbine power generation system, in which symmetry of a PWM control pulse is maintained if a frequency of a load is changed and torque pulsation due to lower order harmonics is suppressed.

Solution to Problem

To solve the above problems, the present invention has been configured as follows.

That is, a control device for power conversion device according to the present invention controls a power conversion device in a system driven by the power conversion device to which an electric motor outputs AC power, and includes: a control pulse generation unit configured to generate a control pulse of the power conversion device; and a negative phase creation unit configured to input a pulse signal output by the control pulse generation unit and rotational speed information of the electric motor, and to generate an inverted signal of an output signal of the control pulse generation unit, wherein the pulse signal of a half cycle during one cycle of voltage, the pulse signal being generated by the control pulse generation unit, and a pulse signal of a next half cycle during the one cycle of voltage, the pulse signal being generated by the negative phase creation unit, are symmetrical in positive and negative relationship of voltage.

Further, other means will be described in forms for implementing the invention.

Advantageous Effects of Invention

According to the present invention, a control device for power conversion device, a power conversion device, an electric motor drive system using the devices, a compressor drive system, and a gas turbine power generation system, in which symmetry of a PWM control pulse is maintained if a frequency of a load is changed and torque pulsation due to lower order harmonics is suppressed, can be provided.

DESCRIPTION OF EMBODIMENTS

Hereinafter, forms for implementing the invention of the present application (hereinafter, referred to as "embodiments") will be described with reference to the drawings.

First Embodiment: Control Device for Power Conversion Device

A control device for power conversion device according to a first embodiment of the present invention will be described with reference to FIGS. 1 and 2.

Figure 1:
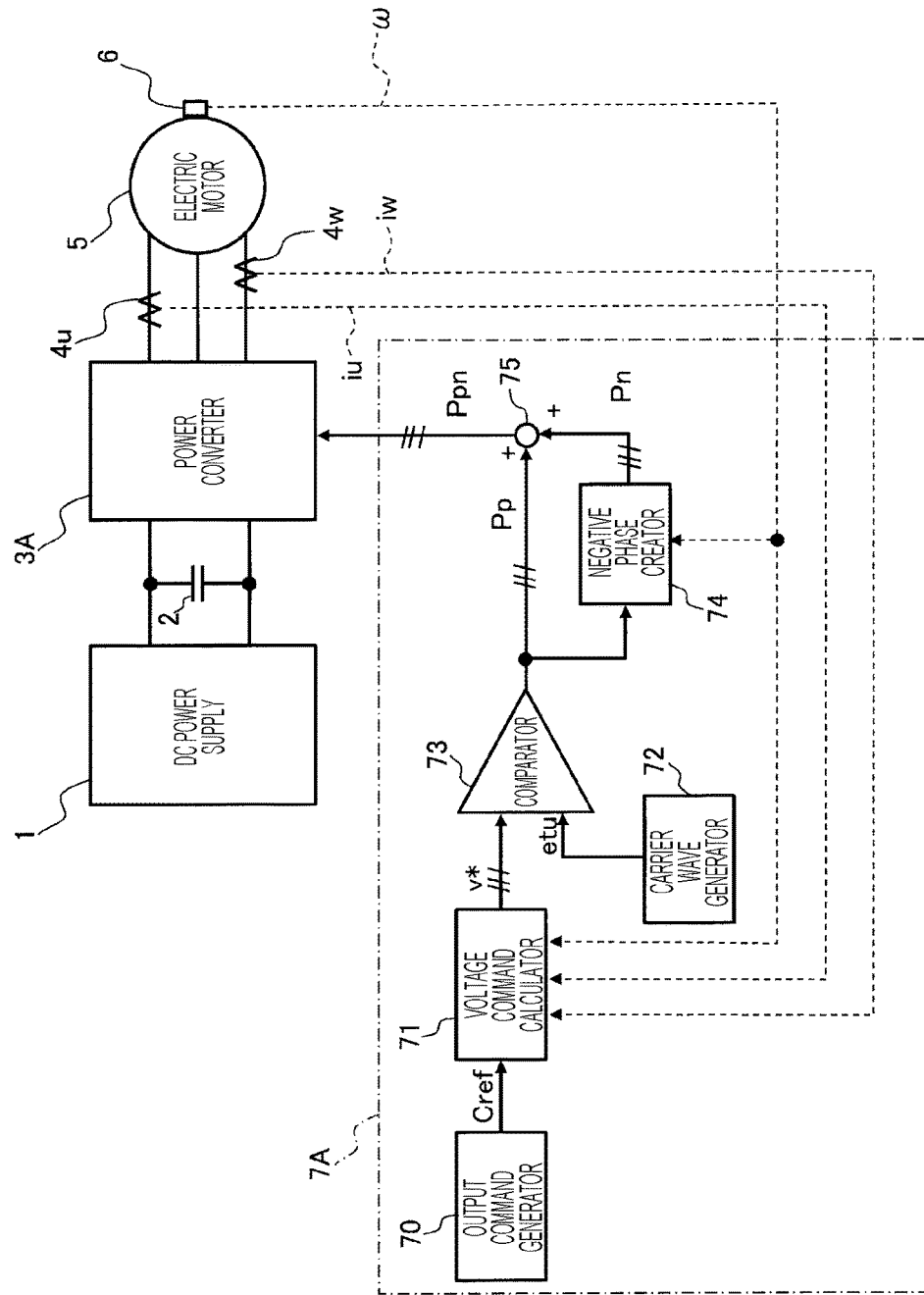
FIG. 1 is a diagram illustrating a configuration example of a control device for power conversion device according to a first embodiment of the present invention, and illustrating relationship between the control device for power conversion device, and a power conversion device and an electric motor.

FIG. 1 is a diagram illustrating a configuration example of a control device for power conversion device 7A according to the first embodiment of the present invention, and illustrating relationship between the control device for power conversion device 7A, and a power conversion device 3A and an electric motor 5.

First, prior to description of a detailed configuration of the control device for power conversion device 7A, a configuration and an operation of a drive system (electric motor drive system) of the electric motor 5, using the power conversion device 3A controlled by the control device for power conversion device 7A, will be described.

In FIG. 1, the power conversion device 3A is a three-level power conversion device that outputs positive, negative, and zero potentials.

A smoothing capacitor 2 is charged by a DC power supply 1, and supplies a DC voltage (power) to the power conversion device 3A.

The power conversion device 3A performs PWM modulation of the DC voltage output from the smoothing capacitor 2 to output an AC voltage (power). The PWM modulation in the power conversion device 3A is controlled by the control device for power conversion device (hereinafter, appropriately referred to as "control device") 7A, and the AC voltage has a predetermined (desired) frequency and voltage amplitude.

The electric motor 5 is driven at a predetermined rotational speed (the number of rotations/unit time) and an output voltage (power) by the AC voltage (power).

A current sensor 4u and a current sensor 4w respectively detect a U-phase current iu and a W-phase current iw, of three-phase AC (the U phase, a V phase, and the W phase) of the power conversion device 3A, and send signals thereof to the control device 7A. Note that a sum of the U-phase current iu, a V-phase current iv, and the W-phase current iw becomes zero. Therefore, if the U-phase current iu and the W-phase current iw are detected, the V-phase current iv can also be obtained.

Further, a rotation sensor 6 detects rotation of the electric motor 5, and sends a signal ω (rotational speed information, the rotational speed is the number of rotations/unit time) thereof to the control device 7.

Note that control of the power conversion device 3A by the control device 7A of FIG. 1 expects asynchronous PWM control.

<<Outline of Configuration and Operation of Control Device 7A>>

In FIG. 1, the control device (control device for power conversion device) 7A includes an output command generator (output command generation unit) 70, a voltage command calculator (voltage command calculation unit) 71, a carrier wave generator (carrier wave generation unit) 72, a comparator (comparison unit) 73, a negative phase creator (negative phase creation unit) 74, and a signal synthesizer (signal synthesizing unit) 75.

The output command generator 70 generates and outputs an output command (output command value) Cref on which to base the power conversion device 3A converts the DC voltage (power) into three-phase AC.

The voltage command calculator 71 calculates a proper voltage of the output command Cref by reference to the signals of the current iu and the current iw detected by the current sensor 4*u* and the current sensor 4*w*, and the signal ω of the rotation sensor 6, and outputs a voltage command value v*. Note that the voltage command value v* is U-phase, V-phase, and W-phase three signals.

The carrier wave generator 72 generates a triangular wave (etu, FIG. 2) having a basic configuration described below as a carrier wave.

The comparator 73 compares the signals of the voltage command value v* (U-phase, V-phase, and W-phase three signals) and a voltage of the carrier wave of the triangular wave, and outputs a positive-phase PWM signal Pp (U-phase, V-phase, and W-phase three signals) (details will be described below with reference to FIG. 2).

Note that a control pulse generator (control pulse generation unit) 70 to 73 is configured from the output command generator 70, the voltage command calculator 71, the carrier wave generator 72, and the comparator 73.

The negative phase creator 74 inverts positive and negative of the output signal of the control pulse generator (70 to 73), that is, the positive-phase PWM signal Pp as the output signal of the comparator 73, stores the inverted signal, delays the signal by a phase π (where the voltage command value v* corresponds to one cycle 2π), and outputs a negative-phase PWM signal Pn (details will be described below with reference to FIG. 2). Note that, in the process of delaying the signal by the phase π, the negative phase creator 74 refers to the signal ω of the rotation sensor 6.

In other words, the negative phase creator 74 that has a pulse signal output by the control pulse generator (70 to 73) and rotational speed information a of the electric motor 5 input, and generates the inverted signal of the output signal of the control pulse generator (70 to 73) is included. Therefore, the pulse signal of a half cycle during the one cycle of voltage generated by the control pulse generator (70 to 73), and the pulse signal of the next half cycle during the one cycle of voltage generated by the negative phase creator becomes symmetrical in positive and negative relationship of voltage.

The signal synthesizer 75 is configured from an adder (adding unit) 75, and synthesizes (adds) the positive-phase PWM signal Pp as the output signal of the comparator 73, and the negative-phase PWM signal Pn as the output signal of the negative phase creator 74, and outputs both positive-and-negative-phase PWM signal Ppn as an output signal of the control device 7A.

The control device 7A controls the power conversion device 3A with both the positive-and-negative-phase PWM signal Ppn.

Note that the positive-phase PWM signal Pp is appropriately described as "positive-phase pulse Pp", the negative-phase PWM signal Pn is appropriately described as "negative-phase pulse Pn", and both the positive-and-negative-phase PWM signal Ppn is appropriately referred to as "both positive-and-negative-phase pulse Ppn".

<<Details of Operation of Control Device 7A>>

Next, details of an operation of the control device 7A will be described.

Figure 2:
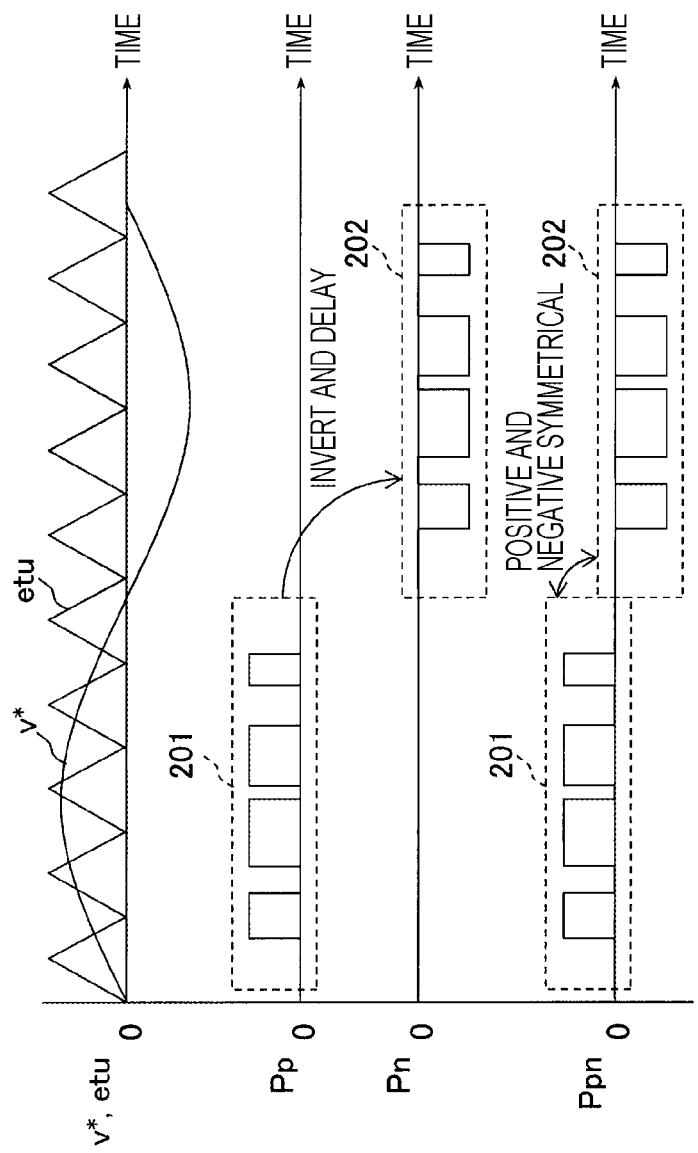
FIG. 2 is a diagram illustrating details of an operation example of the control device for power conversion device according to the first embodiment of the present invention.

FIG. 2 is a diagram illustrating details of an operation of the control device for power conversion device 7A according to the first embodiment of the present invention.

In FIG. 2, the horizontal axis represents passage of time, and the vertical axis represents the voltage command value v* and the carrier wave etu in the uppermost row, the positive-phase pulse Pp of the output of the comparator 73 in the next row, the negative-phase pulse Pn of the output of the negative phase creator in the next row, and the both-positive-and-negative-phase pulse Ppn as the PWM signal of the output of the control device 7A in the lowermost row.

Note that FIG. 2 illustrates only one phase of the U phase, the V phase, or the W phase. For example, FIG. 2 illustrates a waveform of an operation regarding the U phase.

The voltage command value v* illustrated in the uppermost row is a waveform of a sine wave during one cycle (0 to 2π), and the carrier wave etu is a triangular wave. Note that the carrier wave etu is configured from one waveform (only one stage) taking a positive value.

During the half cycle in which the sine wave of the voltage command value v* has the phase 0 to π, the voltage command value v* takes a positive value, and the positive value (0 in other sections) is output in a time when the sine waveform is large, through comparison of the voltage command value v* with the triangular wave of the carrier wave etu in the comparator 73 (FIG. 1). That is, the positive-phase pulse Pp (201) as the PWM signal of the waveform illustrated in the next row in FIG. 2 is output from the comparator 73.

Further, during the half cycle in which the sine wave of the voltage command value v* has the phase π to 2π, the voltage command value v* becomes a negative value, and thus the comparator 73 outputs 0 in the half cycle of π to 2π through comparison of the voltage command value v* with the carrier wave etu taking the positive value.

The negative phase creator 74 (FIG. 1) inverts positive and negative signs of the positive-phase pulse Pp input during the half cycle of 0 to π, then delays the signal by the phase π, and outputs the negative-phase pulse Pn (202).

In the process of delaying the signal by the phase π, the negative phase creator 74 refers to the signal & of the rotation sensor 6.

The signal synthesizer (adder) 75 synthetizes (adds) the PWM signal (positive-phase pulse) Pp as the output signal of the comparator 73, and the PWM signal (negative-phase pulse) Pn as the output signal of the negative phase creator 74, and outputs the synthesized signal, as described above. That is, the signal synthesizer (adder) 75 outputs the PWM signal (both positive-and-negative-phase pulse) Ppn (201, 202, FIG. 2) as the output signal of the control device 7A.

The both positive-and-negative-phase pulse Ppn obtained by synthesizing (adding) the positive-phase pulse Pp output from the comparator 73 and the negative-phase pulse Pn output from the negative phase creator 74 becomes the PWM signal pulse in which the signal in the half cycle of 0 to π and the signal in the next half cycle of π to 2π are symmetrical. Therefore, harmonics of the output voltage of the control device 7A (FIG. 1), especially, lower order-side harmonics can be suppressed (see FIGS. 4A and 4B, details will be described below).

Note that, in the half cycle of π to 2π in which the voltage command value v* becomes the negative value, the signal output from the comparator 73 is zero, as described above, and thus it is not necessary to stop the output of the comparator according to the phase of the voltage command value v*.

Further, as described above, the waveforms illustrated in FIG. 2 are waveforms of an operation regarding the U phase, for example. At this time, the voltage command values v* and the carrier waves etu, the positive-phase pulses Pp, the negative-phase pulses Pn, and the both positive-and-negative-phase pulses Ppn of the V phase and the W phase, which are not illustrated in FIG. 2, become waveforms having phase differences of 2π/3 and 4π/3 from the U phase, respectively.

The V-phase and W-phase waveforms are similar except for the respective phase differences of $2\pi/3$ and $4\pi/3$ from the U phase.

Therefore, overlapping description is omitted.

First Comparative Example

Next, as a comparative example, a case in which a ratio n1 (=fc/f1) of a frequency f1 of a voltage command value v* and a frequency fc of a carrier wave et (see FIG. 3) is not an integer (asynchronous PWM control), and the ratio n1 is small will be described Typically, the asynchronous PWM control can be incorporated into a part of a closed loop control system, and thus can realize a high-response system.

However, in the asynchronous PWM control, when high-response speed control or output control is performed with low torque pulsation, the ratio n1 requires 14 to 15 or more.

In a case of a small or intermediate-capacity system, heat loss by a switching element of a power conversion device is small, and thus the frequency fc of the carrier wave can be set to be high and the ratio n1 can be made sufficiently large.

However, in a device that require a large-capacity power conversion device, such as rolling mill drive, a train, or a var compensator, it becomes difficult to set the frequency fc of the carrier wave to be high from a perspective of heat loss in the high-speed switching element.

For example, to set the frequency fc of the carrier wave to be high, improvement of performance of a cooling device and an increase in size of the device itself are required.

Figure 3:
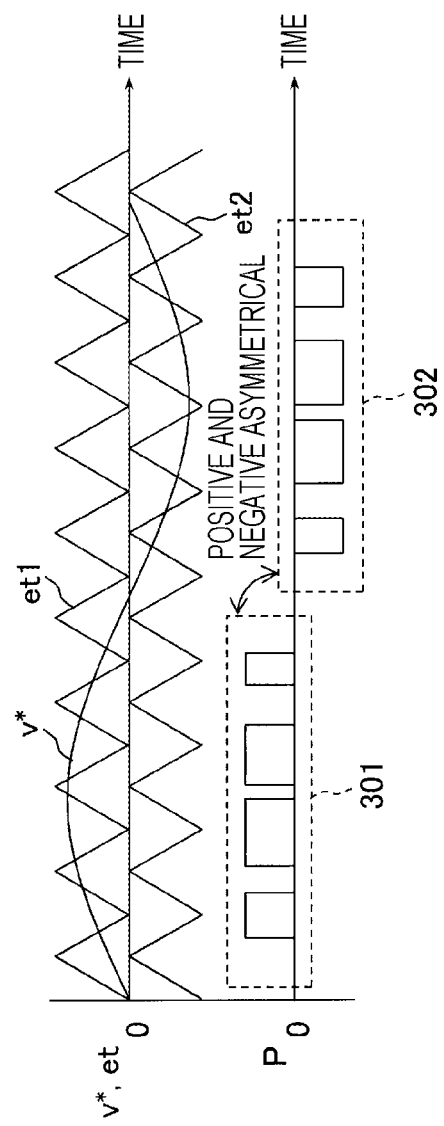
FIG. 3 is a diagram illustrating a method of generating a signal waveform of an output pulse of asynchronous PWM control by comparison with a two-stage triangular wave as a carrier wave in a case where a ratio n1 is small in a first comparative example.

FIG. 3 is a diagram illustrating a method of generating a signal waveform of an output pulse P (P:301 and 302) of the asynchronous PWM control through comparison with two-stage triangular wave (et1 and et2) as the carrier wave et in the case where the ratio n1 (=fc/f1) is small (about 10) in the first comparative example.

In FIG. 3, a voltage command value v* is compared with a first carrier wave et1 by a positive-side triangular wave, and with a second carrier wave et2 by a negative-side triangular wave in a comparator, and a positive-side pulse 301 in 0 to $\pi$ and a negative-side pulse 302 in $\pi$ to $2\pi$ are generated.

A signal waveform (P) serving as the output pulse P of the PWM control in FIG. 3 is output from a control device as a waveform obtained by synthesizing the positive-side pulse 301 and the negative-side pulse 302. At that time, positive and negative of the positive-side pulse 301 and the negative-side pulse 302 are asymmetrical. Therefore, harmonics considerably occurs.

In addition, the frequency f1 of the voltage command value v* and the frequency fc of the carrier wave et (et1 or et2) become closer as the ratio n1 (=fc/f1) becomes smaller, and thus the voltage command value cannot be considered constant in a carrier wave cycle. Therefore, a small phase difference between the carrier wave and the voltage command substantially influences the waveform of the output pulse P.

At this time, as illustrated in FIG. 3, the asymmetry in positive and negative relationship of the waveform of the output pulse P (301 and 302) is increased, and lower order harmonics are increased, and a beat component may occur. Further, along with that, torque pulsation of the electric motor 5 (FIG. 1) is increased with an increase in pulsation of an output current.

Figure 4A:
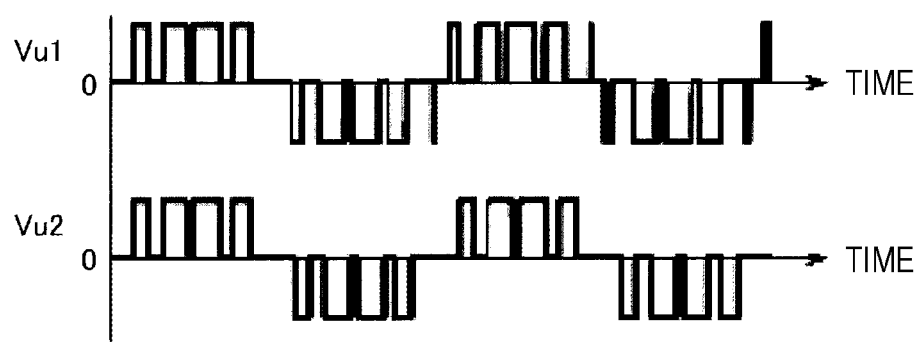
FIG. 4A is a diagram of comparison of voltage waveform examples of a phase voltage by the asynchronous PWM control of the first comparative example and of a phase voltage by asynchronous PWM control according to the first embodiment of the present invention.
Figure 4B:
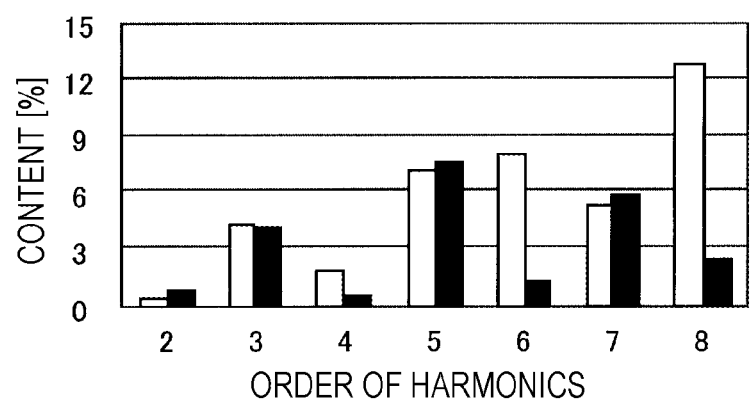
FIG. 4B is a diagram illustrating an analysis result example of respective relative harmonic contents of harmonic components extracted through fast Fourier transform of the waveforms of the phase voltages illustrated in FIG. 4A.

Comparison of Relative Harmonic Content Between First Embodiment and First Comparative Example Next, relative harmonic content of the first embodiment and relative harmonic content of the first comparative example are compared by reference to FIGS. 4A and 4B illustrating simulation results.

Note that, in comparison of FIGS. 4A and 4B, a neutral point voltage installation three-level power conversion device (output voltages are positive, negative and 0) is used as the power conversion device. Further, to have a variable-speed electric motor drive system, the frequency of the voltage command value is increased by 1% in one cycle from 100 Hz while the carrier wave frequency is constant at 940 Hz. As for the first comparative example, a two-stage carrier wave system (et1 and et2: FIG. 3) is used.

FIG. 4A is a diagram in which a phase voltage Vu1 by the asynchronous PWM control in the first comparative example and a phase voltage Vu2 by the asynchronous PWM control in the first embodiment of the present invention are compared. Further, the horizontal axis in FIG. 4A represents passage of time.

In FIG. 4A, the phase voltage Vu1 of the first comparative example are obviously asymmetrical in positive and negative relationship. In contrast, the phase voltage Vu2 of the first embodiment of the present invention is symmetrical in positive and negative relationship.

Further, FIG. 4B is a diagram illustrating an analysis result example of the respective relative harmonic contents of harmonic components extracted through fast Fourier transform of the waveforms of the phase voltages Vu1 and Vu2 illustrated in FIG. 4A.

In FIG. 4B, the horizontal axis represents second to eighth harmonic order and the vertical axis represents the content of the harmonics in the orders (an effective value of the harmonic content/an effective value of a basic wave component).

Further, the black squares represent characteristic values of the first embodiment of the present invention, and the white squares represent characteristic values of the first comparative example.

From FIG. 4B, it is found that the fourth, sixth, and eighth harmonics of the phase voltage Vu2 of the first embodiment of the present invention are substantially decreased, as compared with the phase voltage Vu1 of the first comparative example.

Further, there is no substantial difference in the harmonics other than the fourth, sixth and eighth harmonics.

Further, as for a distortion factor THD from the second to eighth harmonics calculated from FIG. 4B, while 17.9% in the first comparative example, the distortion factor THD is 10.7% in the first embodiment of the present invention, which is substantially decreased.

Note that a total distortion factor THD of the harmonics of the orders is calculated by dividing a total of respective effective values (proportional to the square of a wave height value) of the harmonics of the orders by the effective value of the basic wave, and taking the square root of the divided value. Therefore, the total distortion factor THD is different from a simple total value of the contents of the harmonics of the orders of FIG. 4B.

From the above results, it is found that the first embodiment of the present invention suppresses the lower order harmonics (fourth, sixth, and eighth) that become causes of the torque pulsation and shows effectiveness of the present invention, as compared with the first comparative example.

Second Comparative Example

Next, an outline of synchronous PWM control will be described as a second comparative example, and is compared with the first embodiment of the present invention.

There is a case where a frequency fc of a carrier wave is made low and used. Note that, in a case where the frequency fc of the carrier wave and a frequency f1 of a sine wave of a voltage command value v* are not synchronous (are asynchronous), torque pulsation may be increased.

As measures against the case where the frequency fc of the carrier wave is made low and used, the synchronous PWM control can be employed.

In the synchronous PWM control, a ratio n1 (=fc/f1) of the frequency fc of the carrier wave and the frequency f1 of the voltage command value v* is caused to be a predetermined integral multiple, so that a phase difference between the voltage command value v* and the carrier wave et is adjusted.

In the synchronous PWM control, the ratio n1 (=fc/f1) of the frequency fc of the carrier wave and the frequency f1 of the voltage command value v* is in the relationship of a predetermined integral multiple, as described above, and comparison is repeated in units of one cycle of the frequency f1. Therefore, unnecessary lower order harmonics and beat components are not included in an output current of a power conversion device, and the torque pulsation can be suppressed.

However, in a system in which the frequency fc of the carrier wave is substantially changed with change of the frequency f1 of the voltage command value v*, like a speed control system or an output control system of an electric motor, application of the synchronous PWM control to the closed loop control system is difficult.

Further, harsh noise occurs due to change of the frequency fc of the carrier wave.

Further, the torque pulsation is caused at the time of switching of the number of pulses of the power conversion device.

Further, a control circuit and a control software configuration become complicated.

Further, high response control of a load becomes difficult.

Effects of First Embodiment

Effects of the first embodiment of the present invention are herein described again, as compared with the first comparative example and the second comparative example.

The signals in the half cycle and in the next half cycle become symmetric PWM pulses regardless of the value of the ratio n1 of the frequency f1 of the voltage command value v* and the frequency fc of the carrier wave et (see FIG. 3). Therefore, the lower order harmonics of the output voltage can be suppressed.

Further, during the half cycle where the voltage command value v* becomes the negative value, the signal output from the comparator 73 is zero, and thus it is not necessary to stop the output of the comparator 73 according to the phase of the voltage command value v*. Therefore, the circuit configuration can be simplified.

Further, in the PWM control of the three-level power conversion device described in the first comparative example, the two-stage carrier wave is used to create the three-level control signal. However, in the present invention, only the voltage command value v* of the half cycle is used for control. Therefore, the three-level control signal can be created only with one-stage carrier wave. Therefore, the circuit configuration can be simplified.

Second Embodiment: Control Device for Power Conversion Device

Next, a control device for power conversion device according to a second embodiment of the present invention will be described with reference to FIG. 5.

Figure 5:
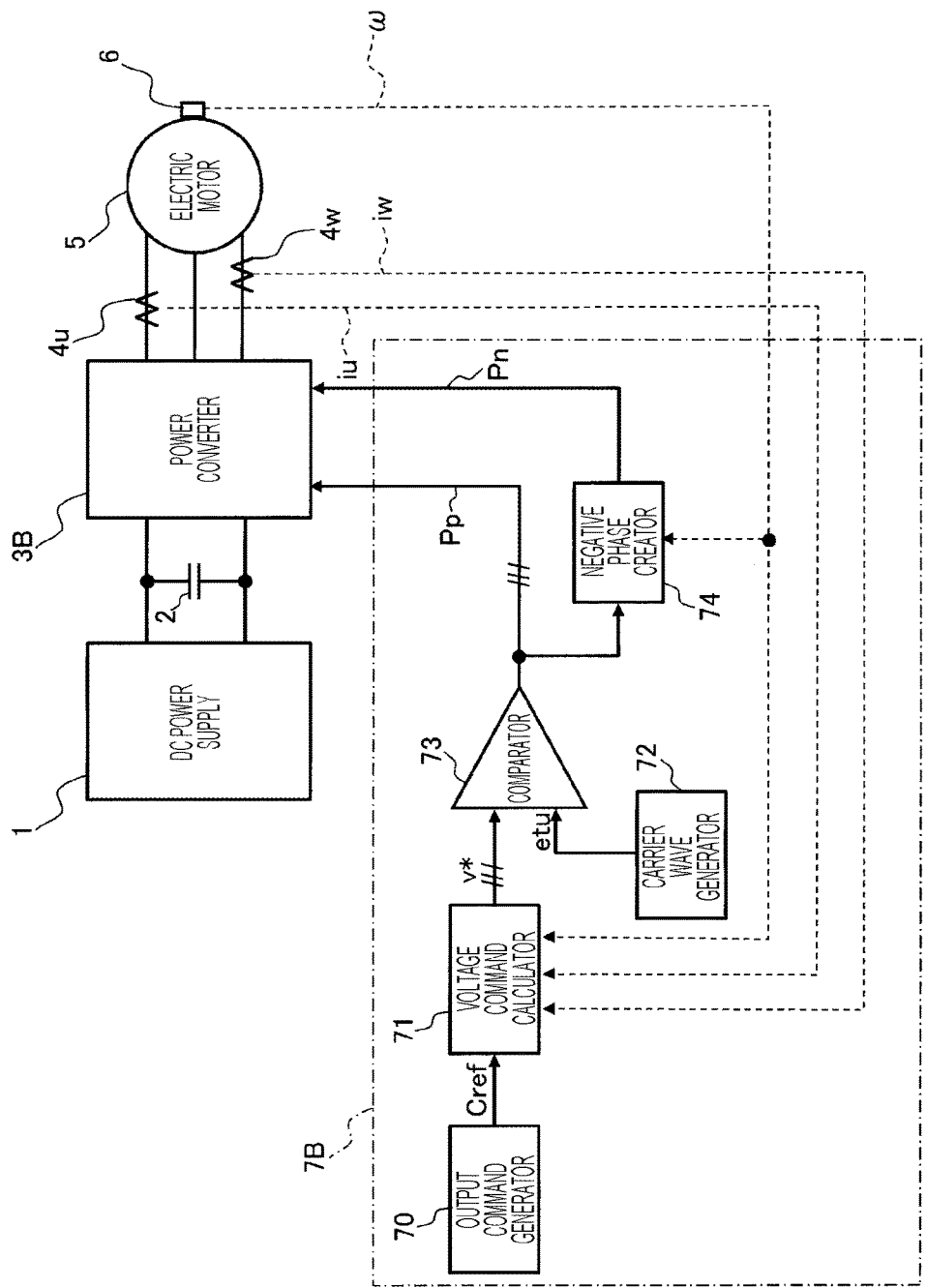
FIG. 5 is a diagram illustrating a configuration example of a control device for power conversion device according to a second embodiment of the present invention, and illustrating relationship between the control device for power conversion device, and a power conversion device and an electric motor.

FIG. 5 is a diagram illustrating a configuration example of a control device for power conversion device 7B according to the second embodiment of the present invention, and illustrating relationship between the control device for power conversion device 7B, and a power conversion device 3B and an electric motor 5.

Differences in FIG. 5 from FIG. 1 are the control device for power conversion device 7B (7A: FIG. 1) and the power conversion device 3B (3A: FIG. 1).

That is, in the control device for power conversion device (hereinafter, appropriately described as "control device") 7B in FIG. 5, no signal synthesizer (adder) 75 of FIG. 1 is included and a positive-phase pulse Pp output by the comparator 73 and a negative-phase pulse Pn output by a negative phase creator 74 are directly input to the power conversion device 3B.

Signals of the positive-phase pulse Pp and the negative-phase pulse Pn input to the power conversion device 3B are divided inside the power conversion device 3B.

That is, the signal reflecting the positive-phase pulse Pp is finally input to semiconductor switches of a positive-side arm in the power conversion device 3B. The negative-phase pulse Pn is finally input to semiconductor switches of a negative-side arm in the power conversion device 3B.

In a case of the configurations of the power conversion device 3B and the control device 7B in the aforementioned relationship, the control device 7B having the configuration illustrated in FIG. 5, which corresponds to the absence of the signal synthesizer (adder) 75 of FIG. 1, is employed.

In FIG. 5 illustrating the second embodiment, configurations other than the power conversion device 3B and the control device 7B are similar to those of FIG. 1 illustrating the first embodiment, and thus overlapping description is omitted.

Note that the control device 7B of the second embodiment illustrated in FIG. 5 has not signal synthesizer (adder) 75 of FIG. 1, and thus can realize downsizing and reduction of cost.

Third Embodiment: Control Device for Power Conversion Device

Next, a control device for power conversion device according to a third embodiment of the present invention will be described with reference to FIG. 6.

Figure 6:
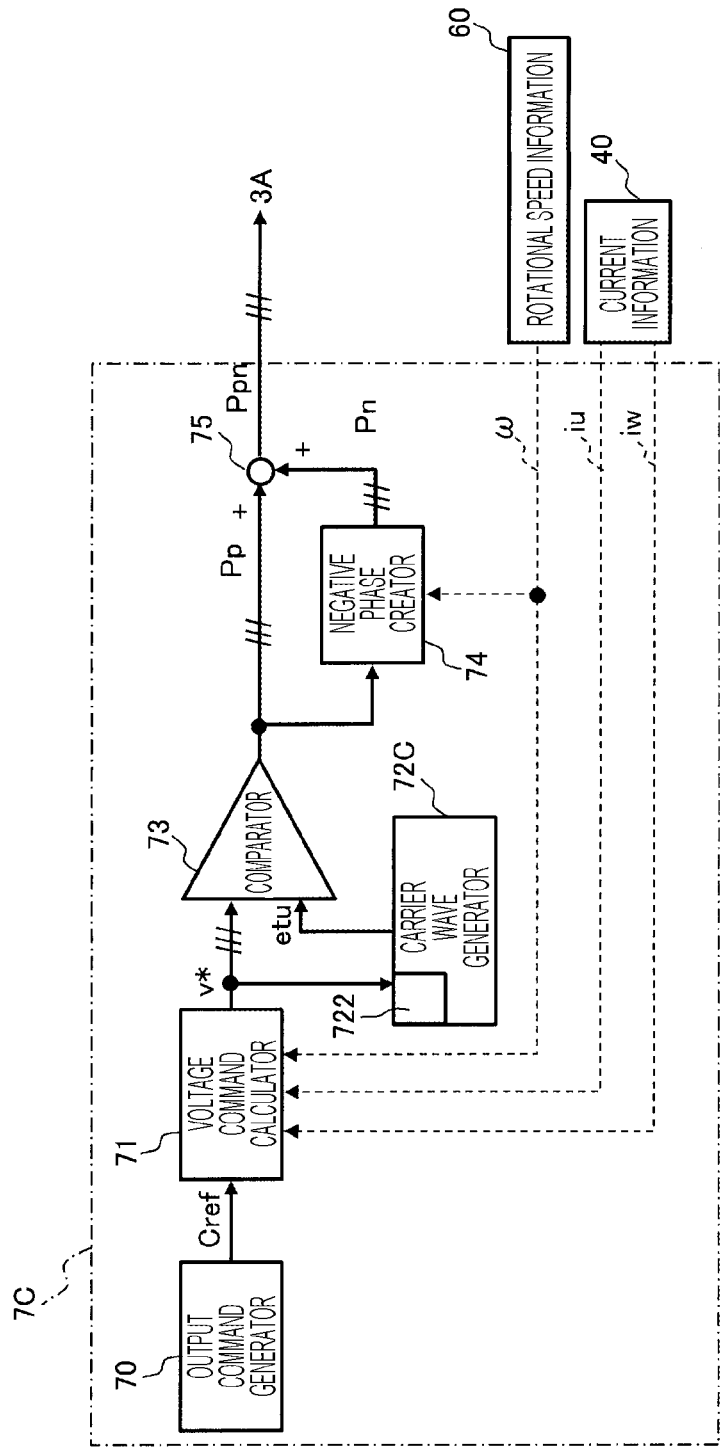
FIG. 6 is a diagram illustrating a configuration example of a control device for power conversion device according to a third embodiment of the present invention.

FIG. 6 is a diagram illustrating a configuration example of a control device for power conversion device 7C according to a third embodiment of the present invention.

A difference of the control device for power conversion device (hereinafter, appropriately described as "control device") 7C in FIG. 6 from the control device for power conversion device 7A in FIG. 1 is a configuration of a carrier wave generator 72C.

In FIG. 6, the carrier wave generator 72C includes a carrier wave creation counter (counter unit) 722 involved in determination of a cycle of a carrier wave (triangular wave and etu: FIG. 2). Then, a voltage command value v* is input from a voltage command calculator 71 to a carrier wave creation counter 722 of the carrier wave generator 72C.

The carrier wave creation counter 722 is reset at timing of zero cross detection, when the voltage command value v* is changed in an up direction or a down direction and passes through a predetermined value (0 voltage). With this reset operation, a sine wave of the voltage command value v* and the carrier wave output by the carrier wave generator 72C can be synchronized with each other in every one cycle.

As a result of the synchronization between the voltage command value and the carrier wave in this way, harmonics of an output voltage can be decreased despite of asynchronous PWM control.

Further, a circuit to take synchronization such as a phase locked loop (PLL) is not required like the synchronous PWM control system of the second comparative example, and the configuration of the control circuit (7C) can be simplified by the circuit.

Fourth Embodiment: Control Device for Power Conversion Device

Next, a control device for power conversion device according to a fourth embodiment of the present invention will be described with reference to FIG. 7.

Figure 7:
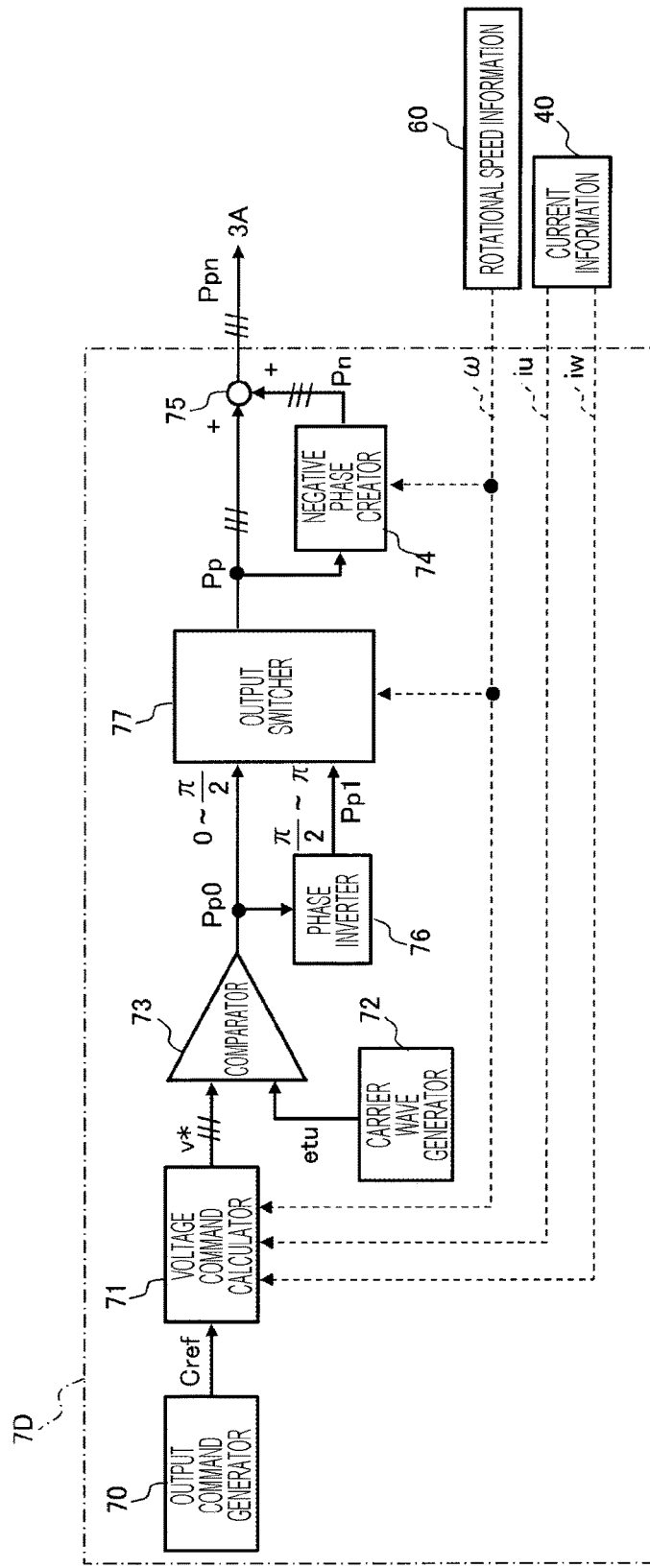
FIG. 7 is a diagram illustrating a configuration example of a control device for power conversion device according to a fourth embodiment of the present invention.

FIG. 7 is a diagram illustrating a configuration example of a control device for power conversion device 7D according to a fourth embodiment of the present invention.

Differences of the control device for power conversion device (hereinafter, appropriately described as "control device") 7D in FIG. 7 from the control device for power conversion device 7A in FIG. 1 are a phase inverter (phase inverting unit) 76 and an output switcher (output switch unit) 77.

In FIG. 7, the phase inverter 76 is input a positive-phase pulse Pp0 from an output of a comparator 73, symmetrizes the positive-phase pulse Pp0 in every quarter cycle (π/2) to generate and store a phase inverted pulse Pp1, and outputs the pulse at timing in a period of π/2 to π.

Note that "symmetrize the positive-phase pulse Pp0 in every quarter cycle (π/2) to generate a phase inverted pulse Pp1" is to generate a waveform (phase inverted pulse Pp1) that is an inverted phase (time) of the waveform (positive-phase pulse Pp0) of 0 to π/2 with respect to (π/2) as an axis of symmetry, as a waveform of π/2 to π.

That is, the phase inverter 76 generates the wave form of the inverted phase (time), and is different from the negative phase creator 74 that generates the waveform of a voltage in which positive and negative are inverted.

Further, an output switcher 77 is input the positive-phase pulse Pp0 from the comparator 73 and the phase inverted pulse Pp1 from the phase inverter 76. Further, a signal e as rotational speed information 60 of an electric motor 5 (FIG. 1) is input.

Then, the positive-phase pulse Pp0 is allowed to pass in a period in which the phase of the voltage command value v* is 0 to π/2, and the phase inverted pulse Pp1 is allowed to pass in a period in which the phase of the voltage command value v* is π/2 to π. Note that, as described above, the phase inverter 76 outputs the stored positive-phase pulse Pp0 from a reverse order. Therefore, the phase inverted pulse Pp1 becomes a waveform symmetrical with the positive-phase pulse Pp0 with respect to (π/2) time.

The positive-phase pulse Pp0 in the period of 0 to π/2 and the phase inverted pulse Pp1 in the period of π/2 to π are switched in the respective periods, and is output from the output switcher 77 as the positive-phase pulse Pp.

Note that, with the above configuration and function, a control pulse generator (70 to 73, 76, and 77) is configured from an output command generator 70, a voltage command calculator 71, a carrier wave generator 72, the comparator 73, the phase inverter 76, and the output switching apparatus 77 in FIG. 7.

In the period in which the phase of the voltage command value is π to 2π, a negative-phase pulse Pn is generated by a negative phase creator 74, similarly to the first embodiment of FIG. 1, and after that, the configuration is similar to the first embodiment. Overlapping description is omitted.

By the control method of the fourth embodiment illustrated in FIG. 7, a both positive-and-negative-phase pulse Ppn of a control PWM signal to be output to a power conversion device 3 becomes symmetrical in every quarter cycle. That is, the signal is symmetrical in every quarter cycle, similarly to the synchronous PWM control in which the ratio n1 (=fc/f1) is integral multiple and the phases are matched, despite of the asynchronous PWM control.

Therefore, lower order harmonics that become a case of torque pulsation can be substantially suppressed.

Fifth Embodiment: Control Device for Power Conversion Device

Next, a control device for power conversion device according to a fifth embodiment of the present invention will be described with reference to FIG. 8.

Figure 8:
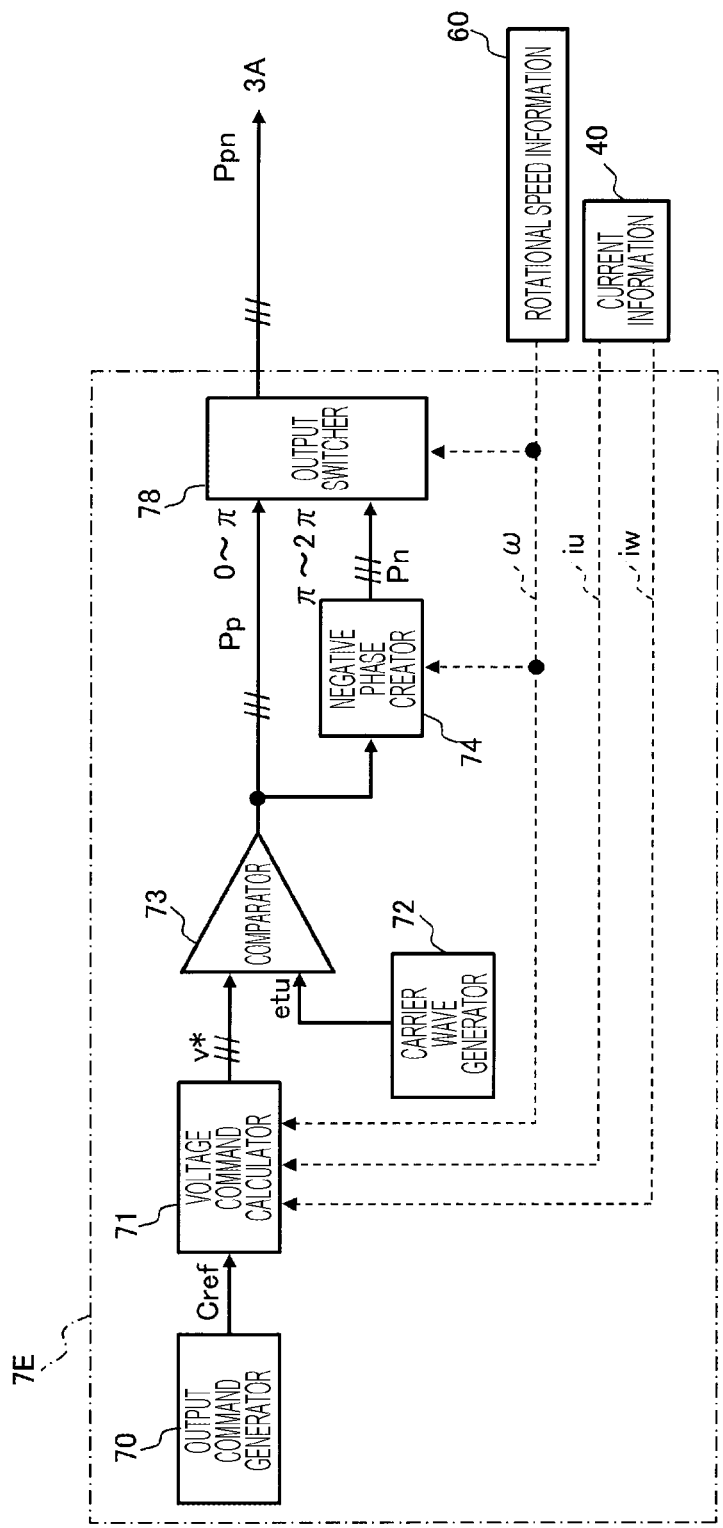
FIG. 8 is a diagram illustrating a configuration example of a control device for power conversion device according to a fifth embodiment of the present invention.

FIG. 8 is a diagram illustrating a configuration example of a control device for power conversion device 7E according to the fifth embodiment of the present invention.

A difference of the control device for power conversion device (hereinafter, appropriately described as "control device") 7E in FIG. 8 from the control device for power conversion device 7A in FIG. 1 is that an output switcher (output switch unit) 78 is included as a signal synthesizer.

The output switcher 78 is input a positive-phase pulse Pp as an output of a comparator 73 and a negative-phase pulse Pn as an output of a negative phase creator 74. Further, a signal ω as rotational speed information 60 of an electric motor 5 (FIG. 1) is input.

The output switcher 78 outputs the positive-phase pulse Pp as the output of the comparator 73 in a period in which a phase obtained from the signal ω is 0 to π, and outputs the negative-phase pulse Pn as the output of the negative phase creator 74 in a period in which the phase is π to 2π.

In the present (fifth) embodiment, a half cycle and a next half cycle of a two-value pulse signal can be symmetrized, and thus the present embodiment can be applied to a two-level converter.

Sixth Embodiment: Power Conversion Device

Next, a power conversion device according to a sixth embodiment of the present invention will be described.

In FIG. 1 or 5, the description has been made, in which the control device for power conversion device (7A or 7B) is a different device from the power conversion device (3A or 3B). However, the power conversion device (3A or 3B) may include the control device for power conversion device (7A or 7B) as a part thereof. Further, the power conversion device (7A) may include the control device for power conversion device (7C, 7D, or 7E) illustrated in FIG. 6, 7, or 8 as a part thereof.

In this way, the power conversion device (3A or 3B) including any of the control devices (7A, 7B, 7C, 7D, and 7E) exhibits an effect to become a power conversion device with suppressed lower order harmonics.

Seventh Embodiment: Compressor Drive System

A configuration of a compressor drive system according to a seventh embodiment of the present invention will be described with reference to FIG. 9.

Figure 9:
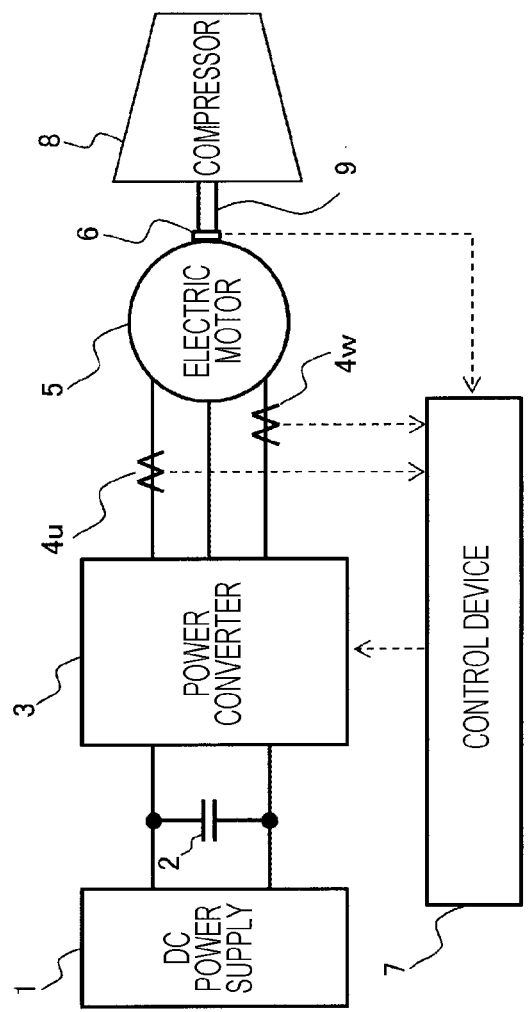
FIG. 9 is a diagram illustrating a configuration example of a compressor drive system according to a seventh embodiment of the present invention.

FIG. 9 is a diagram illustrating a configuration example of a compressor drive system according to a seventh embodiment of the present invention.

In FIG. 9, a DC power supply 1, a smoothing capacitor 2, current sensors 4u and 4w, an electric motor 5, and a rotation sensor 6 are common to the configuration elements with the same reference signs in FIG. 1.

Further, a power conversion device 3 and a control device 7 correspond to the power conversion device 3A and the control device 7A in FIG. 1, respectively.

A compressor 8 in FIG. 9 is driven by the electric motor 5 through a rotating shaft 9.

In the compressor drive system, a variable-speed operation, high efficiency, and high reliability are required.

By use of the control device for power conversion devices (7A to 7E) of the first to fifth embodiments of the present invention, a highly reliable compressor drive system with a low carrier wave frequency, that is, with low loss and suppressed torque pulsation due to lower order harmonics can be provided.

Eighth Embodiment: Gas Turbine Power Generation System

Next, a configuration of a gas turbine power generation system according to an eighth embodiment of the present invention will be described with reference to FIG. 10.

Figure 10:
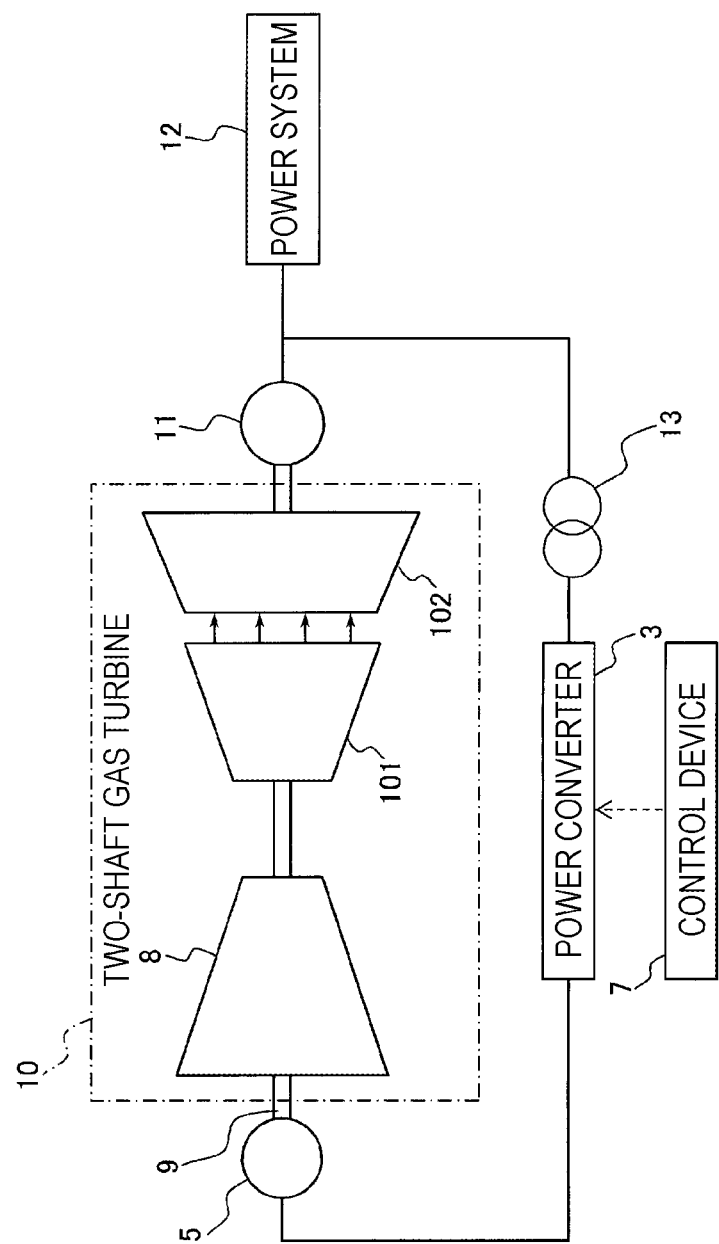
FIG. 10 is a diagram illustrating a configuration example of a gas turbine power generation system according to an eighth embodiment of the present invention.

FIG. 10 is a diagram illustrating a configuration example of a gas turbine power generation system according to the eighth embodiment of the present invention.

In FIG. 10, a power conversion device 3, an electric motor 5, a control device 7, a compressor 8, and a rotating shaft 9 are common to the configuration elements with the same reference signs in FIG. 9.

Further, the two-shaft gas turbine 10 includes a compressor 8, a first-stage turbine 101, and a second-stage turbine 102. Note that the compressor 8 compresses a combustion gas. Further, the first-stage turbine 101 is integrally rotated with the compressor 8, and the second-stage turbine 102 is an output turbine that converts energy of the combustion gas into rotational power.

The electric motor 5 drives the compressor 8 and the first-stage turbine 101 of the two-shaft gas turbine 10 through the rotating shaft 9. The second-stage turbine 102 of the two-shaft gas turbine 10 drives a generator 11 by the power obtained from the combustion of the gas.

The generator 11 generates electricity by the rotational power, and supplies the power to a transformer 13 and a power system 12.

The transformer 13 transforms a voltage of the power obtained from the generator 11 into a predetermined voltage, and supplies the voltage to the power conversion device 3.

Relationship among the power conversion device 3 (3A: FIG. 1), the control device 7 (7A: FIG. 1), and the electric motor 5 is the same as described in the first embodiment with reference to FIG. 1, and thus overlapping description is omitted.

Further, the gas turbine power generation system of the seventh embodiment illustrated in FIG. 10 can input/output inertial energy held by the compressor 8 and the turbines (101 and 102) on the high-pressure side of the two-shaft gas turbine 10 to the power system 12 by torque control of the electric motor 5 driven by the power conversion device connected to the compressor 8, similarly to the principle of flywheel generator.

Further, by assisting or braking the compressor 8 by the electric motor 5, improvement of efficiency at the time of a part-load operation or improvement of air temperature characteristics can be achieved.

Note that it is necessary to drive the electric motor 5 in accordance with these operation states, a variable-speed operation by power control or torque control is required.

Further, in a case where torque pulsation of the electric motor 5 is large and its pulsation component overlaps with a resonant frequency of the gas turbine (two-shaft gas turbine 10), the gas turbine may be tripped due to vibration. Therefore, the torque pulsation needs to be suppressed.

Further, in a case where making a carrier wave frequency high is difficult due to restrictions of a semiconductor element that configures the power conversion device 3, the torque pulsation needs to be suppressed at a low carrier wave frequency.

To respond to the above request and necessity, by use of the control device for power conversion devices (7A to 7E) of the first to fifth embodiment of the present invention, a highly reliable gas turbine power generation system with a low carrier wave frequency and suppressed torque pulsation due to low order harmonics can be provided.

Other Embodiments

The embodiments of the present invention have been described with reference to the drawings. However, the present invention is not limited by the embodiments, and design changes and the like can be made without departing from the gist of the present invention. Examples will be given below.

<<Delay Information of Negative Phase Creator>>

In the first embodiment of the present invention, the delay information of the negative phase creator 74 (FIG. 1) has been created on the basis of the load phase information (c). However, the delay information of the negative phase creator 74 may be created on the basis of phase information of the voltage command value v*.

In a case of using this delay information, an effect not to require wiring from the rotation sensor 6 and the control device 7A is exhibited. Alternatively, the rotation sensor 6 itself may not be required.

Further, the voltage command value v* is in the same control device 7A as the negative phase creator 74, and thus an effect to decrease influences of signal delays and noises in the process of information transmission can be exhibited.

<<Waveform of Carrier Wave>>

In the first embodiment of the present invention, the case in which the carrier wave is the triangular wave and the command value is the sine wave has been described.

However, the carrier wave may be a sawtooth wave. Further, the command value is applicable to other waveforms.

<<Output Level of Power Conversion Device>>

In the first embodiment of the present invention, the description has been given using the three-level power conversion device. However, a four-level or more power conversion device is also applicable in a case where a lower limit value of the carrier wave is zero or more.

<<Signal Synthesizer>>

In the first embodiment of the present invention, the description has been given using the signal synthesizer 75 as the adder. Further, in the fifth embodiment, the description has been given using the signal synthesizer as the output switcher 78. However, the signal synthesizer 75 is not limited to the adder and the output switcher. A selector that selects two signals may be used as long as the selector has a function to synthetize a positive-phase pulse Pp and a negative-phase pulse Pn. Further, signal synthesizers in various concepts may be used in a case where a pulse waveform becomes complicated or a level of a potential of a power conversion device 3 is four or more.

REFERENCE SIGNS LIST

1 DC power supply
2 smoothing capacitor
3, 3A, 3B power conversion device
4$u$, 4$w$ current sensor
5 electric motor
6 rotation sensor
7, 7A, 7B, 7C, 7D, and 7E control device
8 compressor
9 rotating shaft
10 two-shaft gas turbine
11 generator
12 power system
13 transformer
40 current information
60 rotational speed information
70 output command generator or output command generation unit (control pulse generation unit)
71 voltage command calculator or voltage command calculation unit (control pulse generation unit)
72 and 72C carrier wave generator or carrier wave generation unit (control pulse generation unit)
73 comparator or comparison unit (control pulse generation unit)
74 negative phase creator or negative phase creation unit
75 signal synthesizer, signal synthesizing unit, adder, or adding unit
76 phase inverter or phase inverting unit (control pulse generation unit)
77 output switcher or output switch unit (control pulse generation unit)
78 output switcher or output switch unit (signal synthesizing unit)
722 carrier wave creation counter or counter unit

The invention claimed is:

1. A control device for power conversion that controls a power conversion device in a system driven by the power conversion device to which an electric motor outputs AC power,
the control device for power conversion device comprising:
a control pulse generation unit configured to generate a control pulse of the power conversion device;
a negative phase creation unit configured to invert a pulse signal output by the control pulse generation unit and rotational speed information of the electric motor, and to generate an inverted pulse signal;
a signal synthesizing unit configured to synthesize the pulse signal of the control pulse generation unit and the inverted pulse signal of the negative phase creation unit; and wherein the negative phase creation unit includes a half cycle pulse signal of a half cycle during one cycle of voltage, the pulse signal being generated by the control pulse generation unit, and a second pulse signal of a next half cycle during the one cycle of voltage, the inverted pulse signal being generated by the negative phase creation unit, are symmetrical in positive and negative relationship of voltage.

2. The control device for power conversion device according to claim 1, wherein
the control pulse generation unit includes:
an output command generation unit configured to generate command information of an output of the power conversion device;
a voltage command calculation unit configured to calculate a voltage command value based on a current value of the output of the power conversion device, the rotational speed information of the electric motor, and the command information of the output command generation unit;
a carrier wave generation unit configured to generate a carrier wave; and
a comparison unit configured to compare the voltage command value and a voltage value of the carrier wave and to generate the pulse signal.

3. The control device for power conversion device according to claim 2, wherein
the carrier wave generation unit includes a counter unit that is involved in determination of a cycle of the carrier wave, and
the counter unit is reset when the voltage command value is changed in an up direction and a down direction and passes through a predetermined value.

4. The control device for power conversion device according to claim 1, wherein
the control pulse generation unit includes:
an output command generation unit configured to generate command information of an output of the power conversion device;
a voltage command calculation unit configured to calculate a voltage command value on the basis of a current value of the output of the power conversion device, the rotational speed information of the electric motor, and the command information of the output command generation unit;
a carrier wave generation unit configured to generate a carrier wave;
a comparison unit configured to compare the voltage command value and a voltage value of the carrier wave and to generate a positive-phase pulse signal;
a phase inverting unit configured to store the positive-phase pulse signal of the comparison unit, to generate, on the basis of phase information of the positive-phase pulse signal, a phase-inverted pulse signal with an inverted phase with respect to a time axis of every $\pi/2$, and to output the phase-inverted pulse signal; and
an output switch unit configured to switch and output the positive-phase pulse signal of the comparison unit and the phase-inverted pulse output by the phase inverting unit in every quarter cycle of $\pi/2$,
the half cycle pulse signal of the half cycle during one cycle of voltage, the pulse signal being generated by the control pulse generation unit, and the second half cycle pulse signal of the next half cycle during the one cycle of voltage, the inverted pulse signal being generated by the negative phase creation unit, are symmetrical in positive and negative relationship of voltage, and a first half of the half cycle pulse signal and a second half of the half cycle pulse signal during the half cycle, the pulse signal being generated by the control pulse generation unit, are symmetrical with respect to a time axis of every $\pi/2$.

5. The control device for power conversion device according to claim 1, wherein
the signal synthesizing unit is an adding unit that adds the pulse signal of the control pulse generation unit and the inverted pulse signal of the negative phase creation unit.

6. The control device for power conversion device according to claim 1, wherein
the signal synthesizing unit is an output switch unit that switches and outputs the pulse signal of the control pulse generation unit and the inverted pulse signal of the negative phase creation unit.

7. A power conversion device comprising:
the control device for power conversion device according to claim 1.

8. An electric motor drive system using the control device for power conversion according to claim 1,
the power conversion device being a neutral point grounding three-level power conversion device.

9. A compressor drive system using the control device for power conversion according to claim 1, the compressor drive system further comprising:
a compressor using the electric motor as a power source.

10. A gas turbine power generation system using the control device for power conversion according to claim 1, the gas turbine power generation system further comprising:
a compressor using the electric motor as a power source; and
a gas turbine having a rotating shaft to which the electric motor is connected, wherein
the electric motor is driven by the power conversion device, or regenerates power to the power conversion device.

* * * * *